(12) United States Patent
Szarzynski et al.

(10) Patent No.: US 11,587,275 B2
(45) Date of Patent: Feb. 21, 2023

(54) METHOD FOR GENERATING A HANDWRITING VECTOR

(71) Applicant: ConversionRobots Inc., San Francisco, CA (US)

(72) Inventors: Adam Szarzynski, San Francisco, CA (US); Christopher Tosswill, San Francisco, CA (US); Randall Lee Szarzynski, San Francisco, CA (US); Scott Hasbrouck, San Francisco, CA (US)

(73) Assignee: ConversionRobots Inc., San Francisco, CA (US)

( * ) Notice: Subject to any disclaimer, the term of this patent is extended or adjusted under 35 U.S.C. 154(b) by 0 days.

(21) Appl. No.: 17/574,341

(22) Filed: Jan. 12, 2022

(65) Prior Publication Data

US 2022/0148245 A1 May 12, 2022

Related U.S. Application Data

(63) Continuation of application No. 17/026,126, filed on Sep. 18, 2020, now Pat. No. 11,257,267.

(51) Int. Cl.
| | |
|---|---|
| *G06T 11/60* | (2006.01) |
| *B25J 11/00* | (2006.01) |
| *G06F 40/109* | (2020.01) |
| *G06V 10/44* | (2022.01) |
| *G06V 30/32* | (2022.01) |
| *G06V 30/413* | (2022.01) |
| *G06V 10/82* | (2022.01) |

(52) U.S. Cl.
CPC ........... *G06T 11/60* (2013.01); *B25J 11/0005* (2013.01); *G06F 40/109* (2020.01); *G06V 10/44* (2022.01); *G06V 10/82* (2022.01); *G06V 30/347* (2022.01); *G06V 30/413* (2022.01)

(58) Field of Classification Search
CPC ...... G06T 11/60; G06V 30/347; G06F 40/109
USPC ........................................................ 345/468
See application file for complete search history.

(56) References Cited

U.S. PATENT DOCUMENTS

| | | | | |
|---|---|---|---|---|
| 5,412,771 | A | * 5/1995 | Fenwick | ............... G06F 40/109 345/468 |
| 9,886,626 | B1 | * 2/2018 | Stout | .................... G06V 40/382 |

(Continued)

*Primary Examiner* — Thomas J Lett
(74) *Attorney, Agent, or Firm* — Run8 Patent Group, LLC; Peter Miller; Leah Raddatz

(57) ABSTRACT

One variation of a method includes: accessing a handwriting sample comprising a set of user glyphs handwritten by a user; for each character in a set of characters, identifying a subset of user glyphs corresponding to the character in the handwriting sample, characterizing variability of a set of spatial features across the subset of user glyphs, and storing variability of the set of spatial features across the subset of user glyphs in a character container corresponding to the character; and compiling the set of character containers into a handwriting model for the user. The method further includes: accessing a text string comprising a combination of characters in the set of characters; for each instance of each character in the text string, inserting a set of variability parameters into the handwriting model to generate a synthetic glyph representing the character; and assembling the set of synthetic glyphs into a print file.

20 Claims, 9 Drawing Sheets

(56) References Cited

U.S. PATENT DOCUMENTS

| | | | |
|---|---|---|---|
| 2006/0078203 A1* | 4/2006 | Loeb | G06F 40/109 382/187 |
| 2016/0379048 A1* | 12/2016 | Kumar | G06V 30/333 382/189 |
| 2018/0082105 A1* | 3/2018 | Stout | G06V 30/347 |
| 2021/0150789 A1* | 5/2021 | Szarzynski | B25J 11/0005 |

* cited by examiner

| Handwriting Intake Form PROJECT# 000000000 | NAME : ANNA DATE: 04/03/20 | |
|---|---|---|

*Please write words in your normal handwriting style.*

| | | | | | | | |
|---|---|---|---|---|---|---|---|
| And | At | Art | Allow | Assume | Be | Bat | Boy |
| But | Color | Cell | Cat | Chair | Dear | Dive | |
| Dare | Done | Error | Est. | Enough | Edition | | |
| Fog | Fine | Fare | Fry | Gear | Gang | Gone | |
| Give | Heat | Hat | Hi | Hope | In | It | Is |
| Ice | June | Jade | Kind | Kale | Leap | Like | |
| Lay | Love | Meat | Make | Move | Near | Nap | |
| None | On | Orbit | Often | Out | Otter | Pear | |
| Proof | Pants | Polic | Reset | Road | Rate | | |
| Rice | Star | See | Save | Sit | Soar | | |

FIG. 7

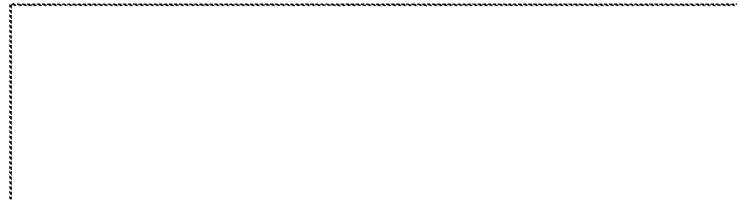
FIG. 8

METHOD FOR GENERATING A HANDWRITING VECTOR

CROSS-REFERENCE TO RELATED APPLICATIONS

This Applications is a continuation of U.S. patent application Ser. No. 17/026,126, filed on 18 Sep. 2020, which claims the benefit of U.S. Provisional Application No. 62/902,246, filed on 18 Sep. 2019, which is incorporated in its entirety by this reference.

TECHNICAL FIELD

This invention relates generally to the field of printing and more specifically to a new and useful method for autonomously generating a handwriting vector in the field of printing.

BRIEF DESCRIPTION OF THE FIGURES

FIG. 7 is a schematic representation of a handwriting sample;
and
FIG. 8 is a schematic representation of the handwriting sample.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
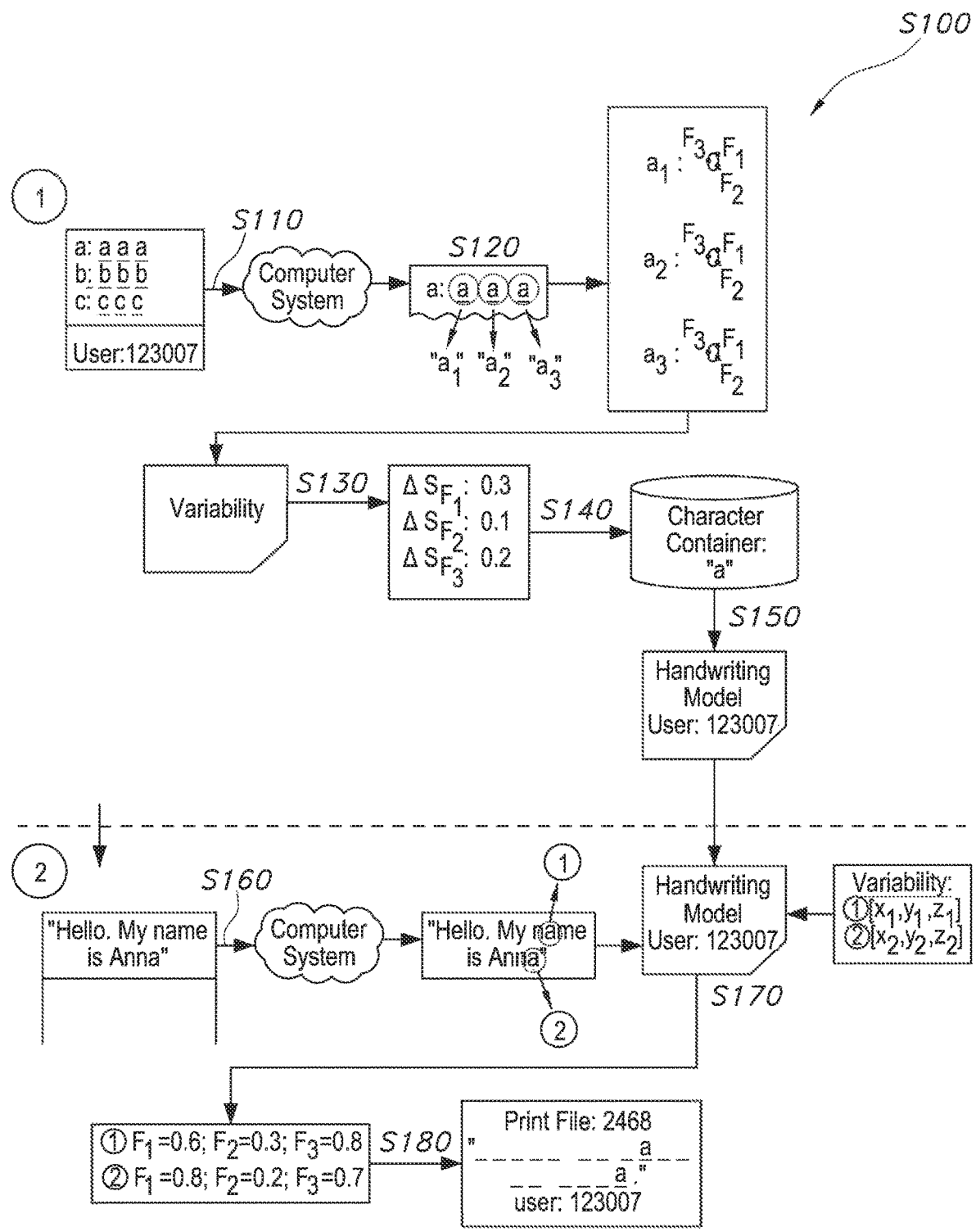
FIG. 1 is a flowchart representation of a method.
Figure 2A:
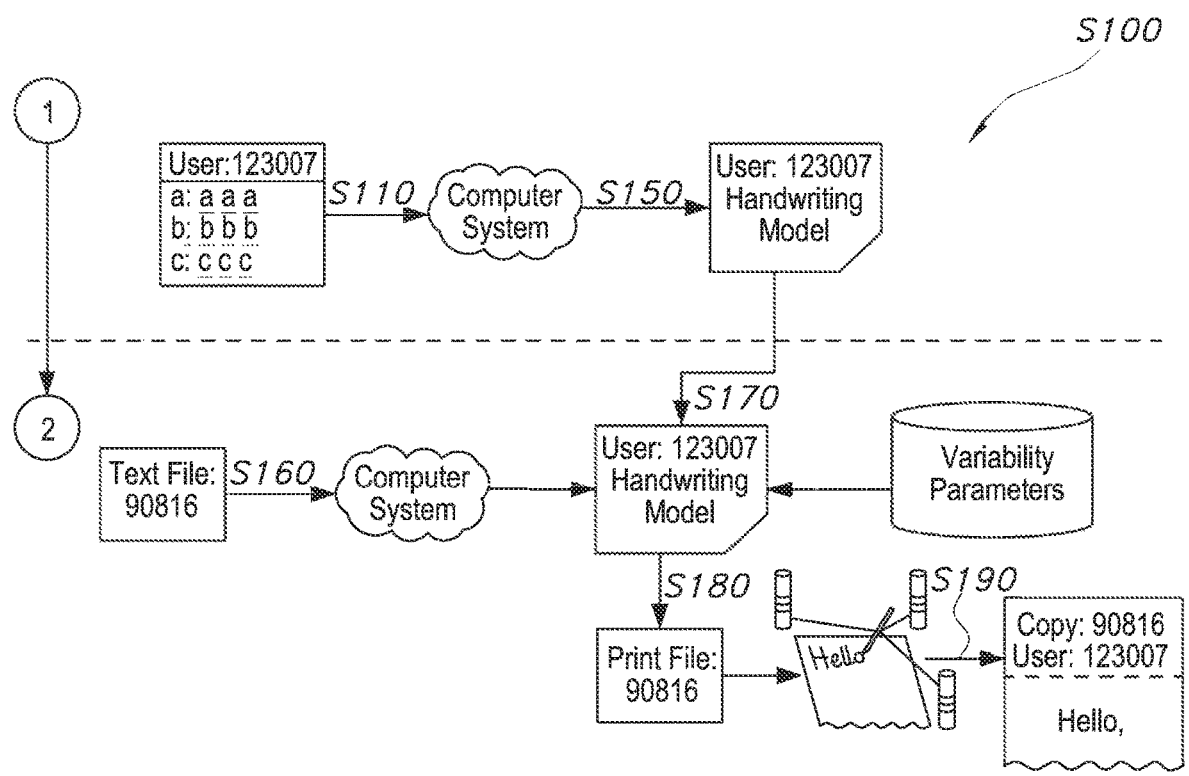
FIGS. 2A and 2B are flowchart representations of the method.
Figure 2B:
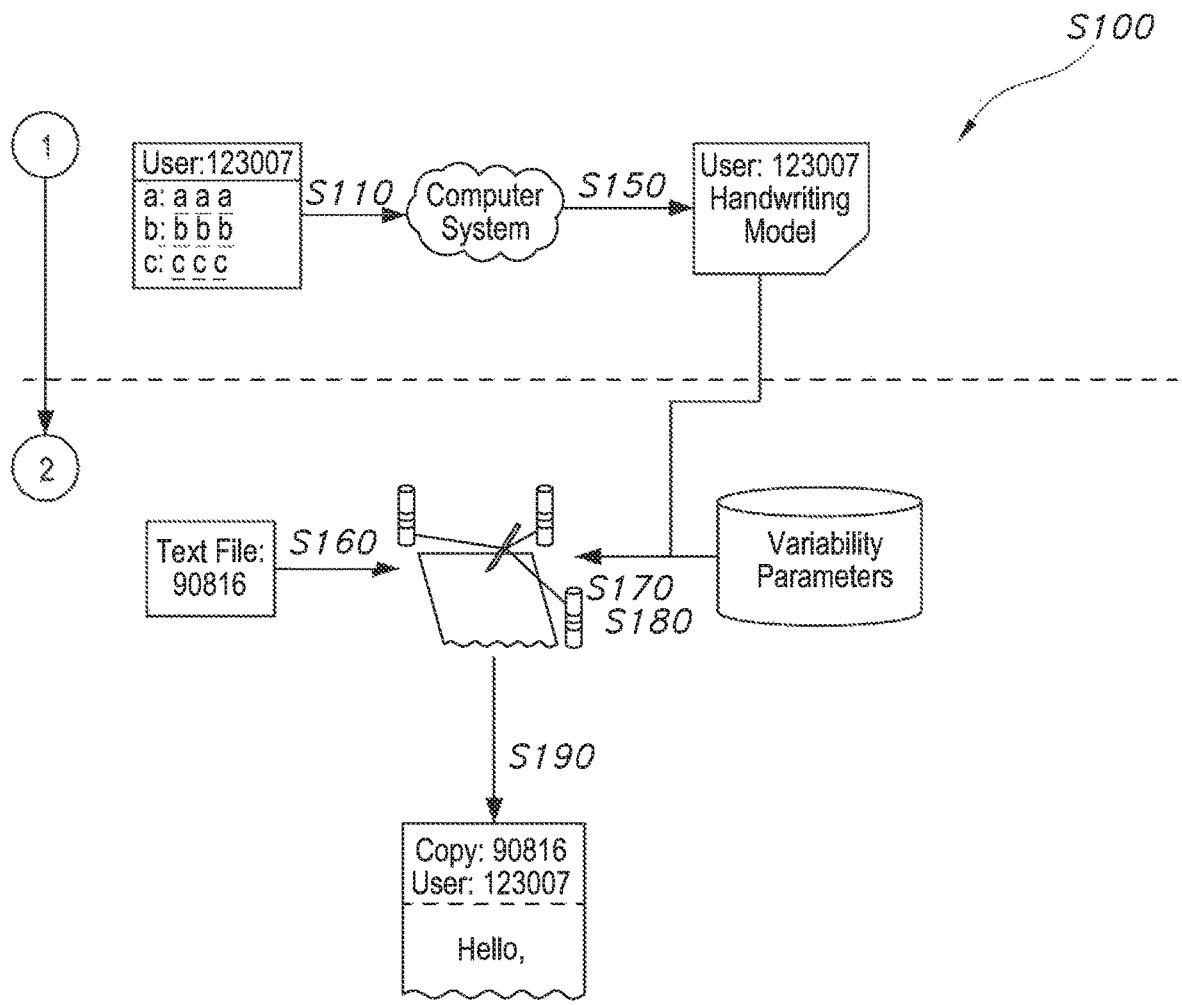

As shown in FIGS. 1, 2A and 2B, a method for S100 includes, during a first period, accessing a handwriting sample comprising a set of user glyphs handwritten by a user and representing a set of characters in Block S110. The method S100 further includes, during the first period, for each character in the set of characters: identifying a subset of user glyphs, in the handwriting sample, corresponding to the character in Block S120; characterizing variability of a set of spatial features across the subset of user glyphs in Block S130; and storing variability of a set of spatial features across the subset of user glyphs in a character container, in a set of character containers, corresponding to the character in Block S140; and compiling the set of character containers into a handwriting model associated with the user in Block S150.

The method S100 further includes, during a second period succeeding the first period: accessing a text string comprising a combination of characters in the set of characters in Block S160; for each instance of each character in the text string, inserting a set of variability parameters into the handwriting model to generate a synthetic glyph, in a set of synthetic glyphs, representing the character in Block S170; and assembling the set of synthetic glyphs into a print file, each synthetic glyph in the set of synthetic glyphs unique to each other synthetic glyph in the set of synthetic glyphs in Block S180.

In one variation, the method S100 further includes: exporting the print file to a robotic system configured to manipulate a writing instrument to generate a written copy of the text string according to the print file, the written copy defining a unique typeface associated with the user in Block S190.

Figure 3:
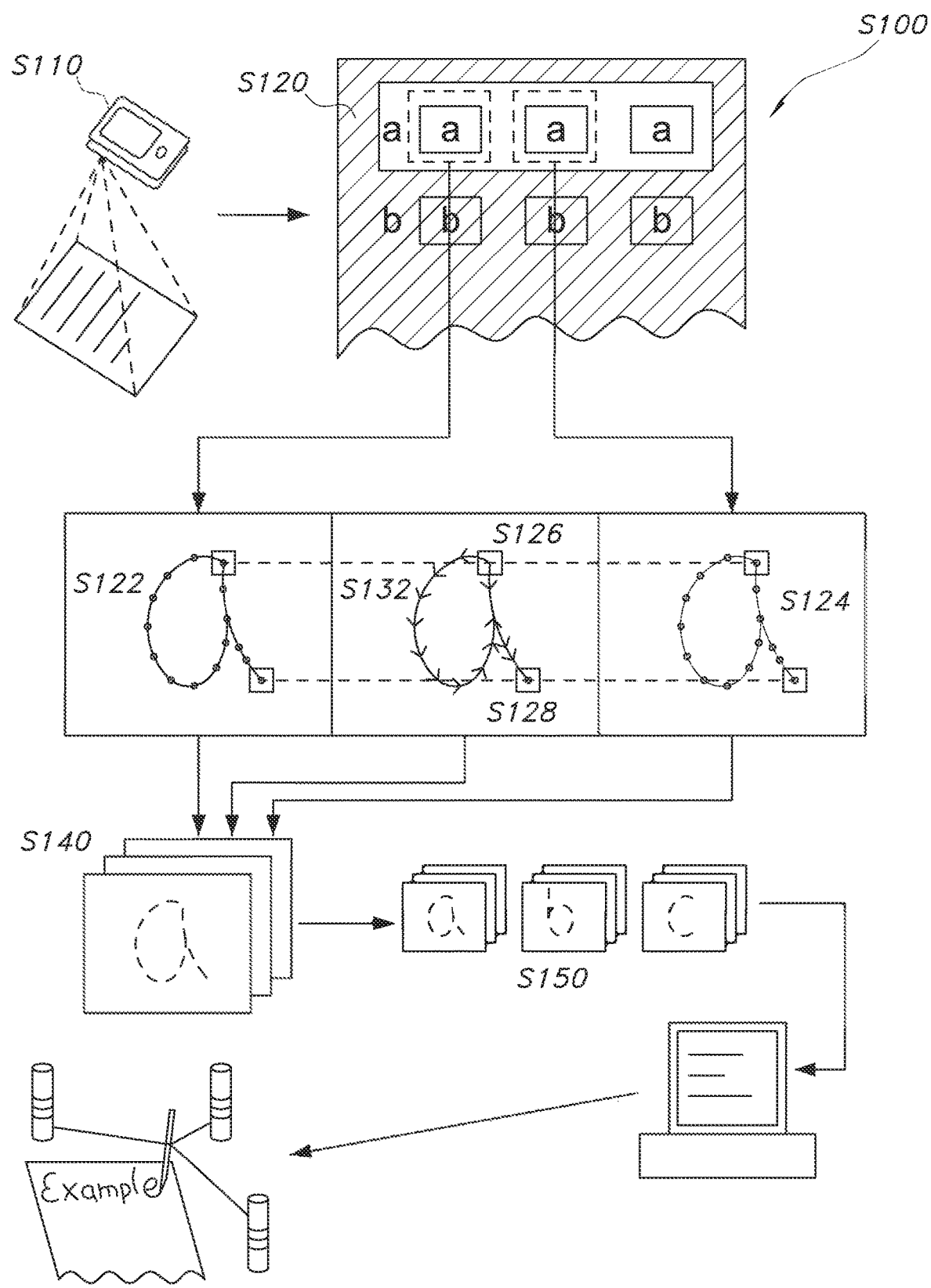
FIG. 3 is a flowchart representation of the method.
Figure 4:
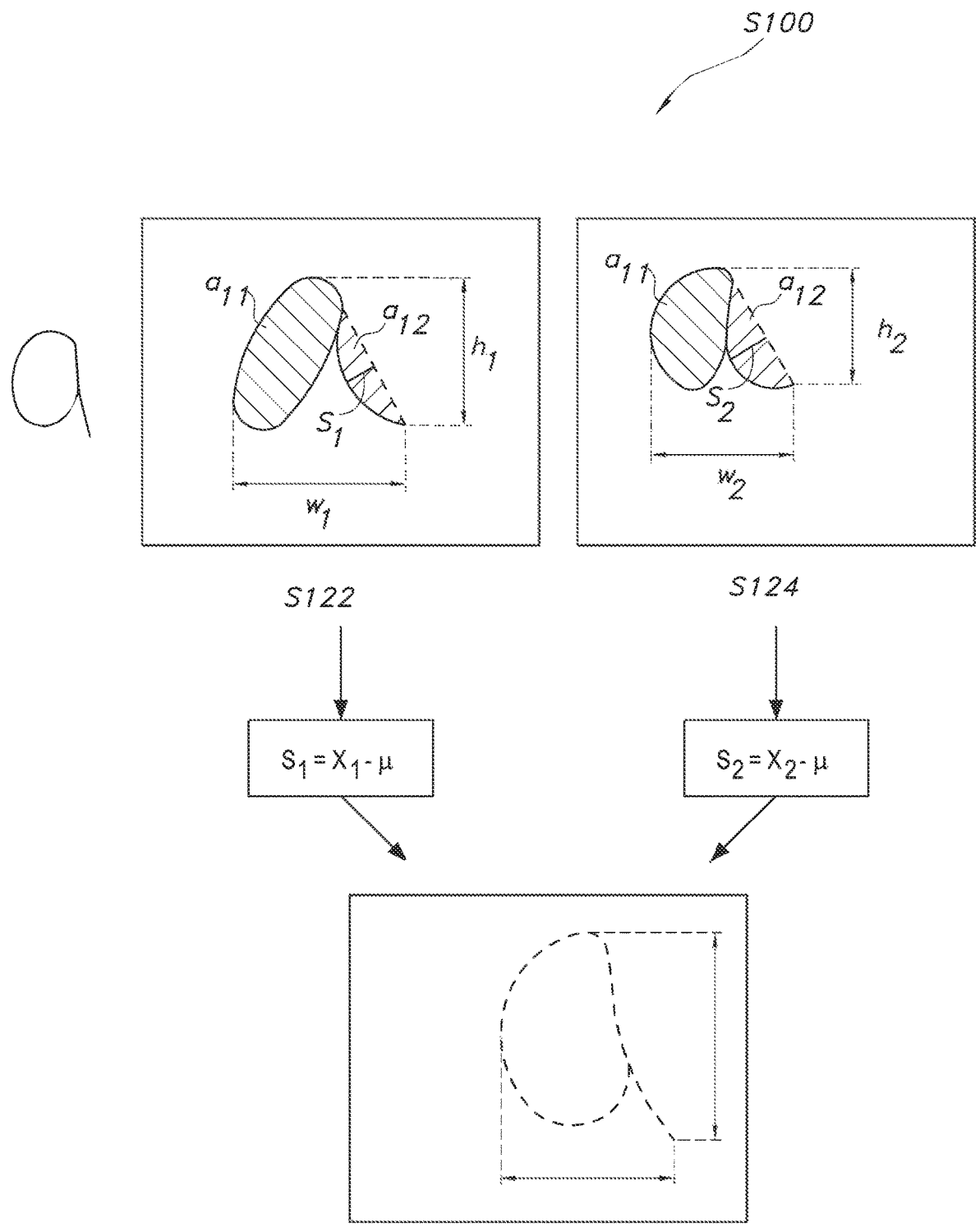
FIG. 4 is a flowchart representation of the method.

As shown in FIGS. 3 and 4, one variation of the method S100 includes: accessing a handwriting sample of the user in Block S110; identifying a first set of user glyphs representative of a first character, in a set of characters, represented in the handwriting sample, each user glyph in the first set of user glyphs handwritten by the user in the handwriting sample in Block S120; selecting a first user glyph in the first set of user glyphs; for a first user glyph, in the first set of user glyphs, corresponding to a first instance of a first character, in the set of characters, extracting a first set of spatial features representative of the first character, the first set of spatial features including a first spatial feature and a second spatial feature in Block S122; for a second user glyph, in the first set of user glyphs, corresponding to a second instance of the first character, in the set of characters, extracting a second set of spatial features representative of the first character, the second set of spatial features analogous the first set of spatial features and including a third spatial feature analogous the first spatial feature and a fourth spatial feature analogous the second spatial feature in Block S124; interpolating a first synthetic spatial feature based on the first spatial feature of the first user glyph and the third spatial feature of the second user glyph in Block S126; interpolating a second synthetic spatial feature based on the second spatial feature of the first user glyph and the fourth spatial feature of the second user glyph in Block S128; generating a first synthetic glyph of the first character based on the first synthetic spatial feature and the second synthetic spatial feature in Block S132; compiling a first digital representation of the first user glyph, a second digital representation of the second user glyph, and the first synthetic glyph into a first character container for the first character in Block S140; and compiling the set of character containers into a handwriting model associated with the user in Block S150.

Figure 5:
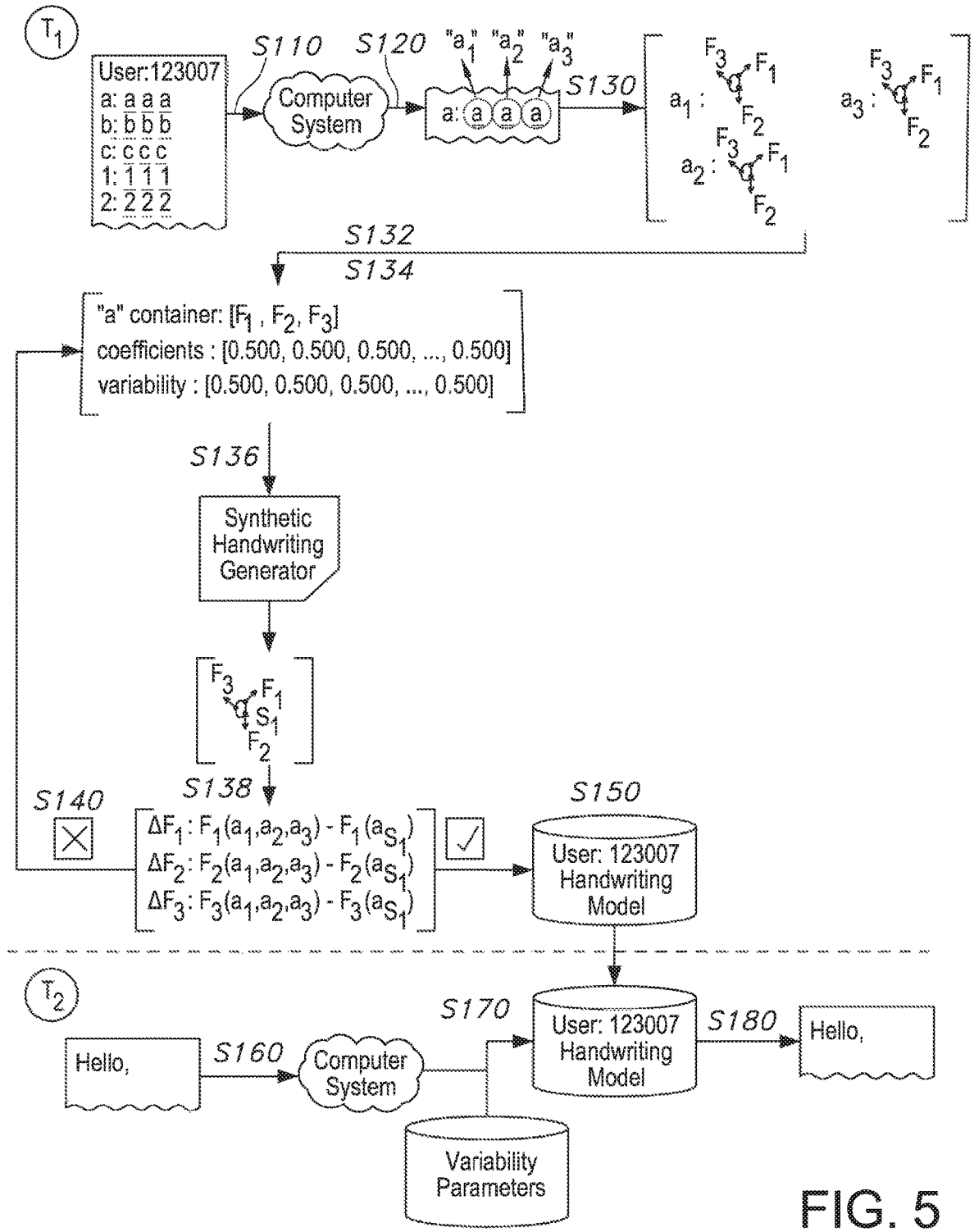
FIG. 5 is a flowchart representation of the method.
Figure 6:
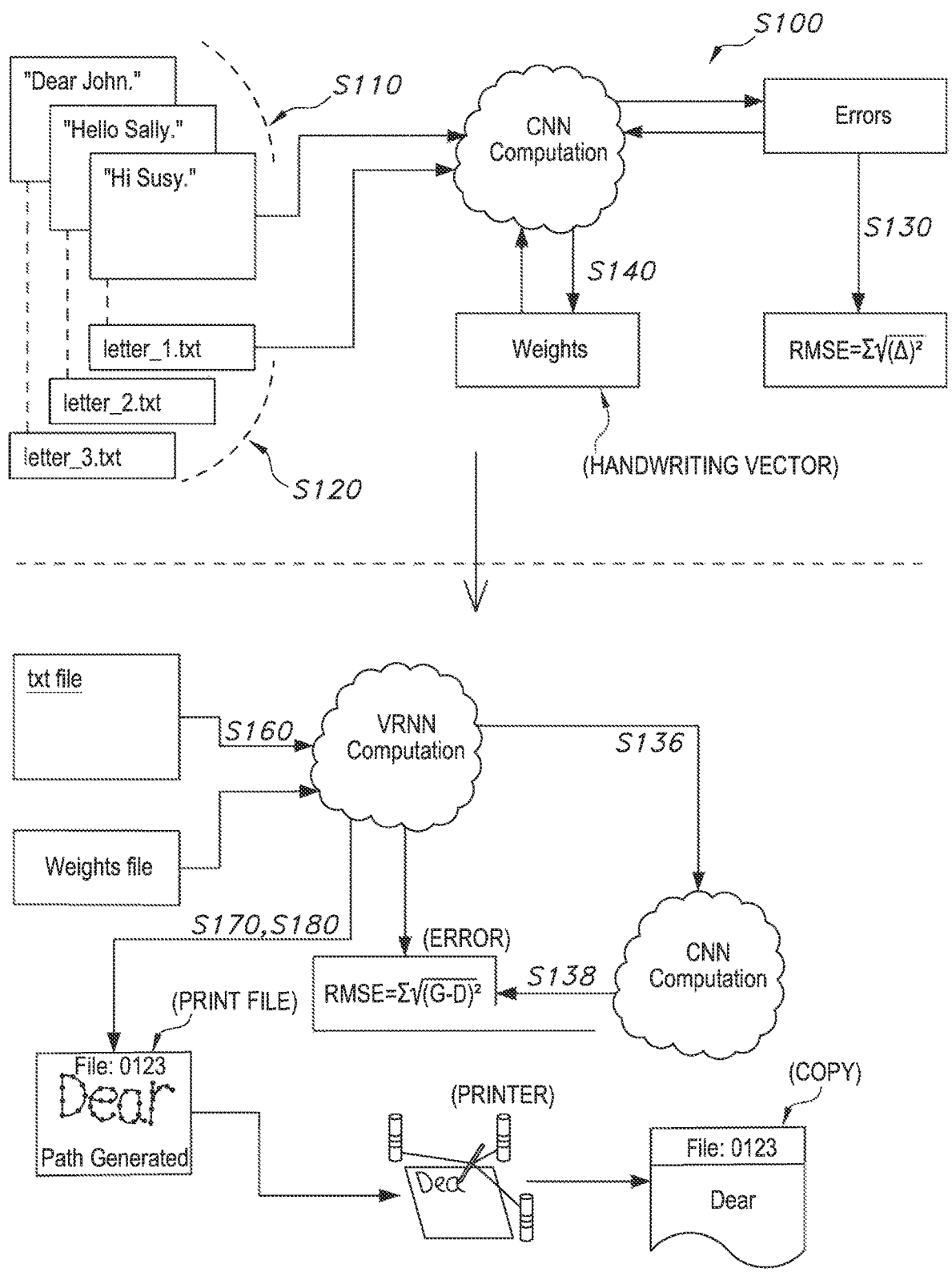
FIG. 6 is a flowchart representation of the method.

As shown in FIGS. 5 and 6, another variation of the method S100 includes, during a first period of time, accessing a handwriting sample comprising a set of user glyphs handwritten by a user and representing a set of characters in Block S110. The method S100 further includes, during the first time period, for each character in the set of characters: detecting a subset of user glyphs, in the set of user glyphs, corresponding to the character in the handwriting sample in Block S120; for each user glyph, in the subset of user glyphs, identifying a set of spatial features corresponding to the character in Block S130; initializing a set of coefficients within a character container, in a set of character containers, of the character based on the set of spatial features in Block S132; initializing a variability vector in Block S134; inserting the character container, the set of coefficients, and the variability vector into a synthetic handwriting generator to generate a synthetic glyph of the character in Block S136; characterizing a difference between the synthetic glyph and the subset of user glyphs corresponding to the character in Block S138; in response to the difference exceeding a threshold difference, adjusting the set of coefficients and the variability vector to reduce the difference in Block S140; and compiling the set of character containers into a handwriting model associated with the user in Block S150. In this variation, the method S100 further includes, during a second period of time succeeding the first period of time: accessing a text string comprising a combination of characters in the set of characters in Block S160; for each instance of each character in the text string, inserting a set of variability parameters into the handwriting model to generate a synthetic glyph, in a set of synthetic glyphs, representing the character in Block S170; and assembling the set of synthetic glyphs into a print file, each synthetic glyph in the set of synthetic glyphs unique to each other synthetic glyph in the set of synthetic glyphs in Block S180.

2. Applications

Generally, the method S100 can be executed by a native application executing on a computing device (e.g., a mobile device, a computer network, a remote server, a local device): to locate, identify, and extract handwritten user glyphs of a set of characters within a written language from a handwriting sample provided by a user; to autonomously generate a handwriting vector—based on these user glyphs—configured to generate synthetic glyphs for characters within the written language and that differ from the user glyphs while appearing authentic to the user's handwriting style; to access a character string of text (e.g., within a text file); and to generate a print file that represents the character string within a sequence of unique synthetic glyphs generated by the handwriting vector. A robotic system (e.g., a single-point printer) can then execute the print file to reproduce the character string in a single-line typeface—that exhibits spatial and geometric glyph variations analogous to the user's authentic handwriting—on physical paper or on another physical writing surface.

In particular, a native application executing on the computing device (hereinafter "the computer system") can: identify and extract spatial features (e.g., endpoints, inflections points, character height, width, aspect ratio, curvature) from each user glyph within a physical or digital handwriting sample submitted by a user; and generate new synthetic glyphs for these characters based on spatial features (e.g., changepoints, character parameters) of the user glyphs. For example, the computer system can interpolate and extrapolate across spatial features of user glyphs for one character in the written language in order to generate a set of synthetic spatial features for this character, generate a single-line vector connecting these synthetic changepoints according to these synthetic spatial features to define a synthetic glyph of this character, and repeat this process to generate additional, unique synthetic glyphs of this character. The computer system can also define boundaries for varying spatial features of user glyphs to generate synthetic glyphs of a character, such as by calculating a variance (or deviation) of each spatial feature in the user glyph of a particular character and maintaining spatial features of synthetic glyphs of this character within a 20% range outside of the maximum and minimum characteristics of the user glyphs for this character. Therefore, the computer system can alter various spatial features of user glyphs of one character in the written language in order to generate synthetic glyphs that are unique from the user glyphs while still emulating the handwriting style of the user for this character. The computer system can execute this process to aggregate user and synthetic glyph sets for each character in the written language.

The computer system then compiles digital representations of the user glyphs and the synthetic glyphs into character containers for each character in the written language and stores these character containers within a handwriting vector for the user. The computer system can then implement this handwriting vector to transform a text string (e.g., extracted from an electronic text document) into a print file executable by a robotic system to reproduce this text string in a unique single-line script—on paper or on another physical surface—that mimics the style and variation of the user's personal handwriting. For example, the computer system can then read in a character string of text and export a print file containing vector coordinates (e.g., [x, y, z, v] coordinates; [θ, φ, r, v] coordinates) that define motion of a writing implement within the writing apparatus to replicate the character string—on a surface (e.g., a piece of paper)—in a typeface that mimics the user's handwriting style.

Furthermore, the computer system can execute Blocks of the method S100 to generate additional synthetic glyphs for a particular character in real-time—as the computer system reads in the string of text—and incorporate these additional synthetic glyphs into the print file. For example, the computer system can: read in a string of text including the word "effervescence"; access the user's handwriting vector; detect three glyphs for the character "e" (i.e., two digital user glyphs and one previously generated synthetic glyph) in the user's handwriting vector; output the first digital user glyph for the first instance of the character "e"; output the second digital user glyph for the second instance of the character "e"; output the synthetic glyph for the third instance of the character "e"; generate and output a first new synthetic glyph for the fourth instance of the character "e"; and generate and output a second new synthetic glyph for the fifth instance of the character "e" such that the print file (and physical document produced by the robotic system according to the print file) contains no identical glyphs. Thus, the method can reduce unnecessary storage of synthetic glyphs for a particular character while also ensuring that the print file contains no identical glyphs.

The computer system can also apply this handwriting vector to the text string to produce many unique print files executable by the robotic system to produce many single-line scripts of the text string—on paper or on another physical surface—that exhibit uniqueness analogous to multiple repetitions of the same text written manually by the user. For example, the computer system can: read in a spreadsheet of names and mailing addresses; detect two names sharing a particular mailing address (e.g., roommates); generate a first print file of the text string for the first name at the particular mailing address; and generate a second print file of the text string—including a different set of synthetic glyphs unique from a set of synthetic glyphs output for the first print file—for the second name at the particular mailing address, such that the individuals corresponding to the names at the particular address will each receive a unique document in the handwriting style of the user.

Thus, the user can leverage her own handwriting vector to produce a large quantity of unique (or semi-unique) "handwritten" documents. For example, the computer system can: receive a text string from the user (e.g., a block of text containing general information about the user's life for an annual newsletter or holiday card typed by the user via a user portal of the native application running on her local device); run a script to input a spreadsheet of the names of friends and colleagues at the beginning of each copy of the annual newsletter; read in each character in the text string and convert each character in the text string into a glyph (e.g., a digital user glyph or a synthetic glyph) from the user's handwriting vector to generate a print file; and output the print file to the robotic system to generate a set of dozens of "handwritten" documents in a fraction of the time it would take the user to hand write each individual document.

Blocks of the method S100 are described herein as executed by a computer system (e.g., a remote server, a computer network) that accesses a handwriting sample: scanned at a local device and uploaded to a remote database; and/or entered directly into the local device (e.g., via a stylus) and then uploaded to the remote database. The computer system thus executes Blocks of the method S100 remotely to: generate a handwriting model based on the handwriting sample; generate print files based on a text file and the handwriting model; and send print files to a local printer (i.e., the robotic system) that prints copies of the text file according to the print file. However, the local device (e.g., a native application executing on the local device), a computer network, the robotic system, and/or any other local or remote device can execute Blocks of the method S100 to support generation and implementation of a handwriting model unique to a user.

3. User Handwriting Sample

The computer system can access a handwriting sample uploaded to the local device by the user and including a set of user glyphs handwritten by the user, such as on physical paper or in a virtual handwriting or sketch environment.

For example, the native application can: prompt the user to handwrite a set of characters; receive a set of user glyphs from the user, wherein each user glyph corresponds to a character in the set of characters; and store the set of user glyphs—identified by their corresponding characters—as a handwriting sample for the user. In this example, the user may handwrite the set of characters directly (e.g., via a stylus, her finger) on a touch-screen device (e.g., a tablet, a smartphone). In another example, the user may handwrite the set of characters on a sheet of paper and capture a photographic image of the sheet of paper with her local device. The local device can then upload this photographic image to a remote database. The computer system can then access the remote database and detect and extract user glyphs from this photographic image and store these glyphs—identified by their corresponding characters—as a handwriting sample for the user.

In one variation, the local device scans a handwriting sample of the user via an optical sensor. Generally, in this variation, the native application can: prompt the user—via the handwriting portal—to record an image of a handwriting sample; and access the optical sensor of the local device (e.g., a mobile phone camera) to record images (e.g., color and/or depth images) of the handwriting sample of the user (e.g., a typeface form, handwriting sample template, written letter, etc.). In particular, the local device can output 2D color images (hereinafter "2D images") of the handwriting sample to be further processed.

The native application can prompt the user to generate a handwriting sample including a predefined set of characters. For example, the native application can prompt the user (e.g., via the handwriting portal) to generate a handwriting sample including: a first subset of characters including letters of the English alphabet "A-Z" in upper-case form; a second subset of characters including letters of the English alphabet "a-z" in lower-case form; a third subset of characters including numerical digits "0-9"; and a fourth subset of characters including a set of punctuation marks.

In one implementation, the native application can prompt the user to generate a handwriting sample including at least one instance of each character in the predefined set of characters. Alternatively, in another implementation, the native application can prompt the user to generate a handwriting sample including multiple instances (e.g., at least two instances) of each character in the predefined set of characters. In this implementation, the computer system can then: access the handwriting sample uploaded by the user to the local device; and extract features of user glyphs corresponding to instances of each character, in the predefined set of characters, and leverage variability between these features to generate synthetic glyphs of each character for the user based on the handwritten user glyphs corresponding to the character.

In one implementation, the native application can prompt the user to generate a handwriting sample including a set of user glyphs representing a set of singular characters (e.g., "a," "b," "c," "1," "2," "3"). The computer system can then extract and store features from user glyphs representing each singular character, in the set of singular characters, to later generate synthetic glyphs representing each singular character and imitating user glyphs in the handwriting sample. In another implementation, the native application can prompt the user to generate a handwriting sample including a set of user glyphs representing a set of character pairs (e.g., "ab," "ac," "12," "13"). In this implementation, the computer system can extract and store features from user glyphs and/or user glyph pairs specific to combinations of characters. For example, the native application can prompt the user to generate a first user glyph pair, including a first user glyph (e.g., the letter "a" handwritten by the user) and a second user glyph (e.g., the letter "b" handwritten by the user), representative of a first character pair (e.g., "ab"). The computer system can extract features from the first user glyph pair, such as a first subset of features of the first user glyph, a second subset of features of the second user glyph, and a third subset of features of the connector between the first user glyph and the second user glyph. Therefore, the computer system can leverage these features of the first user glyph pair to extract insights regarding: how the user handwrites individual characters (e.g., the letter "a" and the letter "b"); how the user handwrites connections between these individual characters (e.g., a transition between the letter "a" and the letter "b"); and how these characters change when written in combination versus when written separately (e.g., "ab" versus "a b").

In a similar implementation, the native application can prompt the user to generate a handwriting sample including a string of user glyphs representing a string of characters (e.g., "abl," "ace," "ade").

In one implementation, as shown in FIGS. 7 and 8, the native application can access a handwriting sample template and prompt the user to generate a handwriting sample according to this template. For example, the native application can prompt the user to print a paper copy of a handwriting sample template including: a first set of defined spaces (e.g., a set of empty boxes, a set of underlined blank spaces) proximal a first character (e.g., the letter "a"), such that the user may generate a first set of user glyphs corresponding to the first character within the first set of defined spaces; a second set of defined spaces proximal a second character (e.g., the letter "b"), such that the user may generate a second set of user glyphs corresponding to the second character within the second set of defined spaces; and so on.

In one implementation, the native application can prompt the user to populate (e.g., by hand) a handwriting sample template including a series of phrases containing every letter of an alphabet (or "pangrams") such as "the quick brown fox jumps over the lazy dog," "pack my box with five dozen liquor jugs," or "crazy Frederick bought many very exquisite opal jewels," to capture each letter of the alphabet while mentally engaging the user to increase the probability of the user completing the handwriting sample template. In another implementation, the native application can prompt the user to handwrite a set of common characters, words, and/or phrases specific to the user. For example, the native application can: prompt a user working in real estate to handwrite a set of common words related to real estate, such as "home," "buyer," and/or "mortgage"; store the set of common words as digital user glyph strings; and generate synthetic glyph strings of the set of common words such that the computer system can generate a script of text—which may include industry-specific terms—in a style or single-line typeface representative of the user's handwriting.

In one implementation, as shown in FIG. 8, the native application can prompt the user to populate (e.g., by hand) a handwriting sample template configured to identify formatting and/or geographic (e.g., within a sheet of paper) handwriting preferences of the user. For example, the native application can prompt the user to handwrite a (predefined) note in a standard business letter writing format. Additionally, the native application can prompt the user to populate a return address of the user (e.g., as it appears on an envelope). The user may upload this handwriting sample or enter the handwriting sample directly into the native application. The computer system can then identify user glyphs in the handwriting sample and extract insights into: the user's handwriting of each user glyph present in the handwriting sample; spacing of different sets of user glyphs (e.g., a salutation, body, and signature line of the note, text lines of the return address) within the handwriting sample (e.g., within the page); and/or placement of each set of user glyphs and/or each user glyph within the handwriting sample (e.g., within the page).

3. Identifying User Glyphs

Generally, the computer system can: implement computer vision techniques to locate each user glyph representative of the first character in the handwriting sample; and select a particular user glyph for further analysis.

In one implementation, the computer system can: scan a handwriting sample template including a set of defined spaces (or "boxes") for the user to handwrite a user glyph of a set of characters (e.g., three boxes for the character "A," three boxes for the character "a," etc.), ligatures (e.g., boxes for "ali," "by," "th," etc.), and symbols (e.g., boxes for "$," "@," "&," "!," etc.); identify a marker indicating the character to be handwritten by the user and extracted from a particular box (e.g., "A"); flag the user glyph in the particular box as the particular character; and select the user glyph in the particular box.

In another implementation, the computer system can apply a series of masks to the paper handwriting sample template to extract each set of user glyphs in series. For example, the computer system can: apply an "A" mask, which obscures all parts of the handwriting sample template except the boxes containing the user glyphs for the character "A"; extract each user glyph for the character "A"; remove the "A" mask; and apply each subsequent mask in series (e.g., "B," "C," etc.). Thus, the computer system can leverage the structure of the handwriting sample template to automate the user glyph extraction process.

In one implementation, the computer system can: index the set of user glyphs (e.g., based on position in the document, glyph size, etc.); and implement the random number generator to pseudorandomly select a subset of user glyphs corresponding to a character from the index. For example, the computer system can: identify a set of 20 user glyphs of the character "a" in the handwriting sample; index the set of user glyphs according to the position of each glyph within the handwriting sample (e.g., the user glyph in a first "a" box of a glyph form occupies a first element of an array, the user glyph in a second "a" box of a glyph form occupies a second element of an array, etc.); implement a random number generator to retrieve a first value representing an element in the array (e.g., two); implement the random number generator to retrieve a second value representing a second element in the array (e.g., ten); and select the user glyph occupying the second element of the array and the user glyph occupying the tenth element of the array. By selecting the two user glyphs pseudorandomly (as described above), the computer system can automate the selection process to reduce the time needed to generate a full typeface of the handwriting of the user. Moreover, by prompting the user to generate more than two user glyphs of the character (in this example 20), the computer system can increase the likelihood of retrieving two user glyphs exhibiting varied character parameters due to user fatigue while handwriting the user glyphs.

In another implementation, the computer system can: identify a set of user glyphs of a particular character in the handwriting sample; select a particular character parameter of the particular character (e.g., aspect ratio, path length, etc.); calculate a deviation value (or variance value) of the particular character parameter for each of the user glyphs in the set of user glyphs; select a first user glyph associated with the highest variance value; and select a second user glyph associated with the lowest variance value. Thus, the computer system can generate a broad range of glyph variants by selecting the user glyph exhibiting the greatest variance value, while increasing readability by selecting the user glyph exhibiting the lowest variance value 4. Modelling User Glyphs The computer system can generate a handwriting model for the user based on the set of user glyphs generated by the user in the handwriting sample. In particular, the computer system can access the handwriting sample including a set of user glyphs handwritten by the user and representing a set of characters. Then, for each character in the set of characters, the computer system can: identify a subset of user glyphs, in the handwriting sample, corresponding to the character; characterize variability of the set of spatial features across the subset of user glyphs; and store variability of the set of spatial features across the subset of user glyphs in a character container, in a set of character containers, corresponding to the character.

4.1 Single Character Modelling

In one implementation, the computer system can populate a set of character containers corresponding to singular characters (e.g., "a," "b," "0," "1", "!", "?") and compile the set of character containers into a handwriting model for the user. In this implementation, the computer system can represent each singular character in a character container corresponding to the character based on spatial features extracted from a subset of user glyphs (e.g., written by the user in the handwriting sample) corresponding to the character.

For example, the computer system can: select a first character (e.g., a lowercase letter "a") in a set of characters represented in a handwriting sample of the user; scan the first handwriting sample for instances of the first character; and, in response to identifying a first instance of the first character in the handwriting sample, extract a first user glyph (e.g., the lowercase letter "a" as handwritten by the user) corresponding to the first instance of the first character in the handwriting sample. The computer system can then identify a set of spatial features from the first user glyph representative of this first user glyph and store the set of spatial features in a first character container (e.g., a container for the letter "a") corresponding to the first character.

4.1.1 Spatial Features

In the foregoing example, once the computer system has identified the first user glyph as the first instance of the first character in the handwriting sample, the computer system can extract a first set of spatial features (e.g., start point position, end point position, changepoint position, character height, character width, max line thickness, min line thickness, max line opacity, min line opacity, line segment length, total character path length, kerning with respect to adjacent letters, negative space of closed areas) representative of the first user glyph. The computer system can then repeat this process for each instance of the first character in the handwriting sample. The computer system can therefore identify a first subset of user glyphs corresponding to instances of the first character in the handwriting sample and extract the set of spatial features for each user glyph in the first subset of user glyphs. The computer system can then insert each set of spatial features for each user glyph, in the first subset of user glyphs, into the first character container of the first character.

In one implementation, the computer system can identify and extract a particular set of spatial features based on the character represented by a user glyph. In the foregoing example, in response to identifying the first user glyph as a representation of the first character, the computer system can: access a first template format, in a set of template formats, corresponding to the first character and defining a first set of spatial features (e.g., position of a start-point, position of an endpoint, character height, character width, aspect ratio, path curvature between the start point and the end point) of the first character; match the first user glyph to the first template format; and extract a spatial value for each spatial feature, in the first set of spatial features, from the first user glyph. The computer system can then insert each of these spatial values, in the first set of spatial features, representative of the first user glyph, into the first character container (e.g., as a vector). The computer system can thus access the first character container at a later time to generate a synthetic glyph, approximating the first user glyph, according to the first set of spatial features.

Generally, the computer system can access a set of spatial features associated with a particular character; select a first spatial feature in the set of spatial features associated with the particular character; scan the first user glyph of the particular character in the handwriting sample; identify the first spatial feature of the first user glyph of the particular character; and extract the first spatial feature value from the first user glyph. In the foregoing example, the computer system can: access a set of spatial features for a lower case "a," (e.g., position of the start-point, position of the endpoint, character height, character width, aspect ratio, path curvature between start point and end point, etc.); select the position of the start point as the first spatial feature; scan the first user glyph of the lower case "a" character in the handwriting sample; identify a point at the top of the line defining the lower case "a" as the start-point of the user glyph; extract an x-value and a y-value of the coordinates of the point at the top of the line defining the lower case "a"; and store the x-value and the y-value of the coordinates of the point at the top of the line defining the lower case "a" as the start point (i.e., the first spatial feature). The computer system can repeat this process for the remaining spatial features, in the set of spatial features, corresponding to the first character, to store a digital representation of the first user glyph (e.g., the lowercase "a" character) in the computer system.

In one implementation, the computer system can: select a changepoint location as the spatial feature; identify a changepoint of the user glyph (e.g., a point where a line ends, a point with a discontinuity or non-continuous slope, points where line thickness decreases by a particular percentage, etc.); and store the coordinates of the changepoint as the spatial feature. In this implementation, the computer system can: define character sections (e.g., stages of character formation, beginning, mid-section, turns, end, etc.) based on thickness variation between a pair of changepoints (e.g., a start point and a transition point). For example, the computer system can: identify a changepoint of a line (or "transition point") defined by transitioning from a thicker line segment to a thinner line segment (e.g., a line segment at a first end of the line exhibiting a line thickness of two millimeters transitioning to a line segment of the line at a second end exhibiting a line thickness of one millimeter); define the line segment preceding the changepoint as beginning a character section; define a start point of the line as the end point of the line segment at the first end and opposite the changepoint point of the line; and define the end point of a mid-line segment as the end point of the mid-line segment opposite the changepoint point of the line section. The computer system can thus generate ordered vector control points based on the changepoints and the character stages to define a stroke order for the user glyph.

In one implementation, the computer system can: identify a set of spatial features of the particular character. For example, the computer system can identify as spatial features: line segment curvature (e.g., the curvature of a line segment between two changepoints; instantaneous line weight or "thickness" (e.g., variance of line thickness at certain points along the path of a line segment from a first changepoint to a second changepoint); total glyph area (e.g., tracing a digital outline of the user glyph and calculating the total area of the outline of the user glyph when accounting for line weight); character rotation (e.g., defining the edges of the box (or page) containing the user glyph as a reference coordinate system; defining a user glyph longitudinal axis and calculating the character slope of the user glyph with respect to the user glyph longitudinal axis and the reference coordinate system); character slope (e.g., bounding the glyph with a parallelogram and calculating the slope of the "vertical" sides with respect to the horizontal sides); glyph length (e.g., the sum total length of all lines/curves of the glyph); character width (e.g., the distance from the leftmost changepoint to the rightmost changepoint); character height (e.g., the distance from the topmost changepoint to the bottommost changepoint); character aspect ratio (e.g. ratio of character width to character height); line opacity (e.g., line opacity is darker at beginning of line segments and after changepoints); character length (e.g., the length of the full path of the user glyph relative to the height and/or width); and additional spatial features specific to particular characters. The computer system can then generate a digital representation of the user glyph based on the spatial features in order to accurately replicate the original user glyph in a variety of sizes and styles (e.g., increasing the font size, or applying italics, etc.). In another implementation, the computer system can identify a subset of the set of spatial features most relevant to a particular character or a particular user glyph to reduce processing time.

4.1.2 Spatial Feature Variability

The computer system can characterize variability of a set of spatial features across all user glyphs corresponding to a particular character. The computer system can leverage variability of spatial features between user glyphs representative of the same character to generate unique synthetic glyphs with variations exhibited in the user's own handwriting (e.g., in the user glyphs). In one implementation, the computer system can: identify a subset of user glyphs corresponding to instances of a character; identify a set of spatial features representative of the character; and, for each spatial feature in the set of spatial features, characterize a spatial feature range of the spatial feature across the subset of user glyphs.

More specifically, in the foregoing example, the computer system can: identify a first spatial feature, in the first set of spatial features, corresponding to the first character; extract a first spatial value for the first spatial feature from the first user glyph corresponding to the first instance of the first character in the handwriting sample; extract a second spatial value for the first spatial feature from a second user glyph corresponding to a second instance of the first character in the handwriting sample; and characterize a first spatial feature range of the first spatial feature across the first subset of user glyphs (e.g., based on a difference between the first and second spatial value). As the computer system identifies additional instances of the first character within the handwriting sample, the computer system can update the first spatial feature range to converge on a more precise representation of variability within this first spatial feature for the first character.

Alternatively, in one implementation, for each spatial feature in the set of spatial features, the computer system can: extract a spatial feature value for each user glyph in the subset of user glyphs corresponding to the character; calculate an average spatial feature across the subset of user glyphs based on the spatial feature value for each user glyph; characterize a deviation from the average spatial feature across the subset of user glyphs; and store the average spatial feature and the deviation for each user glyph, in the subset of user glyphs, in the character container of the character.

In yet another implementation, the computer system can characterize variability of spatial features based on a fixed (or "generic") spatial feature associated with the character. For example, the computer system can: access the first user glyph of the lower case letter "a"; locate a first endpoint of the lower case letter "a" at a first end; locate a second endpoint of the lower case letter "a" at a second end; trace the path from the first endpoint to the second endpoint; calculate the total length of the path (e.g., 25 millimeters); retrieve the fixed spatial value of the lower case "a" (e.g., 20 millimeters); and calculate a value of five millimeters for the first spatial feature deviation. The computer system can then: calculate a spatial feature deviation for each additional user glyph available for this character; sort these user glyphs for the character according to spatial feature deviation; and select a particular user glyph exhibiting the lowest spatial feature deviation for a particular spatial feature as a representative user glyph (or "eigenglyph") for subsequent synthetic glyphs of this character.

The computer system can repeat this variability characterization across the set of spatial features representative of the character. The computer system can then compile spatial feature ranges of the set of spatial features into the corresponding character container representing variability of spatial features, representative of the character, across the subset of user glyphs.

Further, the computer system can inflate variability to generate a more diverse set of synthetic glyphs for the user and therefore a more diverse set of possible character instances. For example, the computer system can inflate a deviation of each spatial feature, in a set of spatial features, across a subset of user glyphs corresponding to a particular character. Therefore, the computer system can generate synthetic glyphs for this character with spatial features within the inflated deviation of each spatial feature, thus enabling the computer system to generate a greater number of more diverse synthetic glyphs for this character.

4.1.3 Character Container

The computer system can store digital representations of each user glyph representative of a character in a character container of the character. In one implementation, the computer system stores a set of digital representations (e.g., 10, 20, 100 digital representations) of a particular character in the character container. For example, the computer system can: identify a set of spatial features representative of the particular character; for each spatial feature in the set of spatial features, extract a set of spatial feature values; and store each set of spatial feature values in the character container (e.g., in vector form), such that the computer system can access a particular set of spatial feature values in the character container to generate a digital representation of a particular user glyph corresponding to the particular set of spatial feature values. In this implementation, the computer system can also characterize variability of these spatial features across each user glyph corresponding to the character and leverage this variability to generate a set of synthetic glyphs. The computer system can store a set of spatial features for each synthetic glyph, in the set of synthetic glyphs, in the character container of the character.

Alternatively, in another implementation, the computer system can characterize variability of the set of spatial features for a subset of user glyphs representative of a particular character and store this variability in the character container, such that the computer system can later generate synthetic glyphs based on this variability in the character container. Therefore, by storing variability in the character container, rather than storing a set of spatial features for each user glyph, the computer system can minimize storage in the character container and further minimize time required for calculations of new synthetic glyphs.

The computer system can repeat this process for each character, in the set of characters, to generate a set of character containers representative of the set of characters.

4.1.3.1 Synthetic Glyph Generation

In one implementation, the computer system can: generate a fixed number of synthetic glyphs for a particular character; and store the fixed number of synthetic glyphs in the character container for the particular character. The computer system can later access the character container to select synthetic glyphs for insertion into a print file.

For example, the computer system can: generate a set of twenty synthetic glyphs for the character "a"; store the twenty synthetic glyphs for the character "a" in the character container for the character "a"; store the character container for the character "a" in a handwriting vector for the user; and, later, access the handwriting vector as the computer system reads in a character string to select a first synthetic glyph, in the set of twenty synthetic glyphs, for representation of a first instance of the character "a" in the character string. In this example, the computer system can: select a unique synthetic glyph for the character "a" each time the character "a" is represented in the character string until each synthetic glyph, in the set of twenty synthetic glyphs, has been selected; and cycle back through the character containers to reuse synthetic glyphs, in the set of twenty synthetic glyphs, if there are more than twenty instances of the character "a" in the character string.

By generating a fixed number of glyphs for a particular character, the computer system can reduce processing time and quickly access previously generated synthetic glyphs as the computer system reads in the character string. Further, the computer system can adjust a quantity of synthetic glyphs stored in the character container of each character based on a frequency of use of a particular character, such as by generating additional synthetic glyphs for characters that are used more frequently in a particular language (e.g., the character "e" in English) and fewer synthetic glyphs for characters that are used less frequently in the particular language (e.g., the character "q" in English). The computer system can therefore reduce a probability that a particular synthetic glyph may be repeated in a particular print file while reducing processing times to generate these print files by storing fewer synthetic glyphs for a particular subset of characters.

The computer system can leverage variability of each spatial feature—extracted from the user glyphs of the character—to generate synthetic glyphs of the character. For example, the computer system can: extract a first user changepoint and a second user changepoint of a first user glyph representative of a first character; extract a third user changepoint and a fourth user changepoint of a second user glyph representative of the first character, the third user changepoint analogous to the first user changepoint and the fourth user changepoint analogous to the second user changepoint; interpolate a first synthetic changepoint from the first user changepoint and the third user changepoint; interpolate a second synthetic changepoint from the second user changepoint and the fourth user changepoint; and generate a first synthetic glyph of the first character including a first synthetic pathway extending from the first synthetic changepoint to the second synthetic changepoint. Generally, the computer system can: align the first user glyph and the second user glyph in a cartesian coordinate system; extend a first guideline from the first user changepoint of the first user glyph to the third user changepoint of the second user glyph; extend a second guideline from the second user changepoint of the first user glyph to the fourth user changepoint of the second user glyph; generate the first synthetic changepoint at the midpoint of the first guideline; generate the second synthetic changepoint at the midpoint of the second guideline; and generate the first synthetic glyph of the first character extending the first synthetic path from the first synthetic changepoint to the second synthetic changepoint. Thus, the computer system can generate synthetic glyphs interpolated from user glyphs to populate a dynamic typeface (or "handwriting vector") to mimic the handwriting of the user.

4.1.4 Handwriting Model

The computer system can repeat the process described above for each character, in the set of characters, to generate a handwriting model for the user. In particular, for each character in the set of character, the computer system can: identify a subset of user glyphs, in the handwriting sample, corresponding to the character; characterize variability of a set of spatial features across the subset of user glyphs; and store variability of the set of spatial features across the subset of user glyphs in a character container, in a set of character containers, corresponding to the character. The computer system can then compile the set of character containers, representative of each character in the set of characters, into a handwriting model associated with the user.

4.2 Character Pair Model

In one implementation, the computer system can populate a set of character containers (or "character pair containers") corresponding to pairs of characters (e.g., "ad," "am," "an," "at"). The computer system can initially prompt the user to handwrite a set of character pairs corresponding to all possible and/or probable combinations of two characters. The computer system can then implement the methods and techniques described above for populating a character container to populate character pair containers.

Alternatively, in another implementation, the computer system can extract insights from character pairs handwritten by the user to modify the character container of the character. In this implementation, the computer system can identify spatial features of a character in a character pair that may change based on a corresponding character in the character pair. The computer system can store spatial features extracted for a character in a character pair in the character container of the character. Later, the computer system can more heavily weight spatial features extracted from user glyphs of the character in the character pair than spatial features of the character extracted from user glyphs of the singular character when the character is combined with another character in a text file to generate a synthetic glyph of the character matched to the user.

Further, the computer system can populate a set of character connectors representative of a pathway between an endpoint of a first character and a start point of a second character succeeding the first character. The computer system can implement the methods and techniques described above for populating a set of character container to populate a set of character connectors. The computer system can then compile the set of character connectors into the handwriting model.

4.3 Character Triad Model

In one implementation, the computer system can populate a set of character containers (or "character triad containers") corresponding to triads of characters (e.g., "and," "but," "for"). The computer system can initially prompt the user to handwrite a set of character triads corresponding to all possible and/or probable combinations of three characters. The computer system can then implement the methods and techniques described above for populating a character container to populate character triad containers.

In another implementation, the computer system can extract insights from handwritten user glyphs of character triads to modify character containers of individual characters in the character triad. For example, the computer system can prompt the user to handwrite a first user glyph corresponding to the letter "e." Additionally, the computer system can prompt the user to handwrite a first string of user glyphs corresponding to the letters "bet." The computer system can extract a set of spatial features corresponding to the letter "a" from both the first user glyph and the first string of user glyphs. In this example, the computer system can assign a higher weight (e.g., factor) to the letter "e" in the first string of user glyphs and a lower weight to the letter "e" in the first user glyph as it is less likely that an "e" character will be present in a text string as an individual character (e.g., not connected to other characters). Therefore, in extracting the set of features for each instance of the letter "e" in the handwriting sample of the user and/or characterizing variability of this character for the user, the computer system can more heavily weight the instance of the "e" character in the first string and thus generate synthetic glyphs of the letter "e" more closely resembling the "e" character in the first string.

5. AI Modelling

In variation, as shown in FIGS. 5 and 6, the computer system implements adversarial and convolutional neural networks to train a synthetic handwriting generator configured to ingest a text file including a string of characters; ingest a handwriting model of a user in the form of a handwriting vector; ingest a variability vector configured to modify the handwriting vector to generate variability; and return a string of synthetic glyphs (e.g., in a print file) that approximate the user's handwriting of the string of characters.

To train this synthetic handwriting generator, the computer system can sample handwriting strings of user glyphs, representative of a set of characters, from a population of users. The computer system can then implement a spatial feature extractor configured to identify user glyphs in a handwriting sample and extract spatial features from these user glyphs to generate a global handwriting model based on the handwriting strings of the population of users. The computer system can then leverage this global handwriting model to generate a handwriting model for a particular user by iteratively adjusting a first set of coefficients of the global handwriting model (e.g., in vector form) and a second set of coefficients of the baseline variability vector (e.g., in vector form) until the adjusted handwriting model returns handwriting matched to the user.

For example, as shown in FIG. 6, the computer system can implement a compound AI system including: a Generative Adversarial Network (or "GAN") including a Variational Recurrent Neural Network (or "VRNN") configured to generate sequential handwriting paths and a Convolutional Neural Network Long Short-Term Memory Network (or "CNN-LSTM"). In this compound system, the VRNN CAN serve as a generator (i.e., the synthetic handwriting generator) and the CNN-LSTM CAN serve as a discriminator. The generator can: ingest a text file including a string of characters; ingest a pre-trained handwriting "weights" file (i.e., the global handwriting model) including values of the parameters in the neural networks; and ingest variability hyperparameters (i.e., the variability vector) configured to modify the generated handwriting vector with stochastic variability; and return a string of synthetic paths (i.e., the set of synthetic glyphs) in a print file that approximate the user's handwriting of the string of characters.

In the foregoing example, to train the synthetic handwriting generator and the discriminator, the computer system can implement a two-phase process. During the first phase, the computer system can sample handwriting strings of user glyphs from a population of users and matched to text files of character strings. The computer system can then leverage these handwriting samples and accompanying plaintext to optimize the parameters in the CNN-LSTM via stochastic gradient descent (or "SGD"), an iterative computational method where error between predicted handwriting and actual handwriting is minimized by tuning the parameters in the model. Therefore, by implementing this iterative computational method, the computer system can tune a corpus of parameters (e.g., tens of millions of parameters) in order to correctly detect user handwriting. Once the CNN-LSTM is optimized, the computer system can then implement the spatial feature extractor configured to identify user glyphs in a handwriting sample and extract spatial features from these user glyphs. The computer system can thus generate the global handwriting model based on the handwriting strings of the population of users.

In addition, in the foregoing example, the computer system can: "transfer" these learned parameter values from the global population of users can to a new model file; and train this new model file for a specific user. In particular, during the second phase, the computer system can generate handwriting candidates from a Variational Recurrent Neural Network (VRNN). To optimize the tens of millions of parameters in this VRNN, the computer system can rank the generated handwriting candidates by implementing the previously trained CNN-LSTM in a "feedforward" model. Based on the ranking by the CNN-LSTM, the computer system can iterate this flow (e.g. hundreds or thousands of times) within the VRNN until error is minimized. Once the first phase and the second phase are complete, the VRNN can generate new synthetic glyphs of characters (e.g., in a print file), given a text input, autonomously.

5. Spatial Feature Extractor

Generally, the computer system can implement a spatial feature extractor to: detect an instance of a character in a text file including a set of user glyphs; to scan this instance of the character to extract a set of spatial features corresponding to the character; and to represent locations, orientations, and/or sizes of these spatial features—detected in a first user glyph corresponding to the instance of the character in a character container, in a set of character containers, for this character. In particular, the computer system can implement the spatial feature extractor: to detect spatial features of a user glyph representing the character; and to represent these spatial characteristics in a single character container (e.g., a vector, a matrix).

For example, to generate a character container from a handwriting sample of a user, the computer system can: access the handwriting sample including a set of user glyphs representing a set of characters; implement optical character recognition to detect a first instance of a first character, in the set of characters, represented by a first user glyph in a subset of user glyphs representative of the first character; and initialize a character container in the form of a vector of length equal to a total quantity of predefined spatial features in a set of spatial features of the first character. Then, for a first spatial feature, in the set of spatial features, the computer system can: scan the first user glyph for a feature analogous to the first spatial feature; extract a first location (and/or a first size, orientation) of a particular spatial feature depicted in the first user glyph in response to identifying this particular feature as analogous to (e.g., of a similar form, relative location, relative size) the first spatial feature according to the spatial feature extractor; and then write this first location (and/or first size, first orientation) of the particular spatial feature to a first position in the vector corresponding to the first spatial feature. Similarly, for a second spatial feature in the set of spatial features, the computer system can: scan the first user glyph for a feature analogous to the second spatial feature; and then write a null value to a second position in the vector corresponding to the second spatial feature in response to failing to identify a particular spatial feature analogous to the second spatial feature in the first user glyph. The computer system can then repeat this process for each other spatial feature in the set of spatial features and each other instance of the first character in order to generate the character container for this character.

5.2 Synthetic Handwriting Generator

The computer system can implement a synthetic handwriting generator to transform a text file (e.g., uploaded by the user)—including a string of characters—and a handwriting model of the user into a print file, which defines a representation of the string of characters in a typeface resembling the user's handwriting. In particular, the computer system can inject a text file into the synthetic handwriting generator to generate a print file that—when executed by the robotic system—produces a printed copy of content of the text file written in a typeface that may be perceived as the user's own handwriting. For example, the computer system can implement the synthetic handwriting generator to: generate and validate a new handwriting model for the user (e.g., based on an initial handwriting sample of the user); and/or to generate print files for character strings contained in text files uploaded by the user.

In one implementation, the computer system: accesses a population of handwriting samples (e.g., thousands, millions) from a population of users; implements the spatial feature extractor to extract a character container for each character, in a set of characters, across the population of users; and trains a conditional generative adversarial network to generate a string of synthetic glyphs (e.g., in a print file)—given a text file and a user-specific handwriting model containing a set of coefficients or "weights"—with statistics analogous to the population of handwriting samples.

Further, the synthetic handwriting generator can be configured to ingest a variability vector to generate differences between each instance of a repeated character within the string of synthetic glyphs (e.g., represented in the print file) output by the synthetic handwriting generator. For example, the variability vector can include one pseudorandomly-generated variability value (e.g., between 0.00000 and 1.00000) for each character in a text file.

5.3 Handwriting Model Calculation

Furthermore, the computer system can leverage the spatial feature extractor and the synthetic handwriting generator to generate a handwriting model for the user, such as based on the handwriting model supplied by the user during the setup period.

In one implementation, the computer system accesses a handwriting sample of the user; detects a subset of user glyphs corresponding to each instance of a character in a set of characters contained in the handwriting sample; and implements the spatial feature extractor to generate a target character container for the character based on the character. The computer system then: defines a target set of character coefficients (or "weights," "conditions"); implements the synthetic handwriting generator to transform the target character container and the target set of character coefficients into a target synthetic glyph; and characterizes a first difference between the target synthetic glyph and the subset of user glyphs representing the character. The computer system further: adjusts the target set of character coefficients to reduce the first difference; implements the synthetic handwriting generator to transform the target character container and the revised set of character coefficients into a revised target synthetic glyph; characterizes a revised difference between the revised target synthetic glyph and the subset of user glyphs representing the character; and repeats this process until this difference falls below a threshold difference. The computer system can then: store the final set of character coefficients in the character container representing this character; and repeat this process for each character in the set of characters to generate a set of character containers for the user. Finally, the computer system can compile the set of character containers into a handwriting model for the user.

For example, the user can upload (e.g., scan) a handwriting sample, containing a set of user glyphs handwritten by the user and representing a set of characters, onto her local device. Then, for each character in the set of characters, the computer system can: identify a subset of user glyphs, in the set of user glyphs, corresponding to the character; implement the spatial feature extractor to detect a set of spatial features corresponding to the character; and generate a target character container including the set of spatial features. The computer system can then: initialize a target set of coefficients (e.g., [0.5000, 0.5000, 0.5000, 0.5000, 0.5000, . . . 0.5000]); initialize a target variability vector (e.g., [0.5000, 0.5000, 0.5000, 0.5000, 0.5000, . . . 0.5000]); and insert the target character container, the target set of coefficients, and the target variability vector into the synthetic handwriting generator to generate a first target synthetic glyph of the character. Then, the computer system can: characterize a first difference between the first target synthetic glyph and the subset of user glyphs (e.g., based on average spatial features and average spatial feature variability across the subset of user glyphs) representing the character; and in response to the difference exceeding a threshold difference, adjust the target set of coefficients and/or target variability vector to reduce the first difference. The computer system can continue adjusting the target set of coefficients and/or target variability vector until the difference falls below the threshold difference for this character.

6. Font File

The computer system can extend a font-line connecting a first endpoint of an open line (or "stroke") of a digital representation of a user glyph to a second endpoint of the first line of the digital representation of a user glyph to generate a closed figure. By generating a closed figure for each open digital representation of a user glyph (and synthetic glyphs), the computer system can generate a valid font file readable by most operating systems. The computer system can also find and remove the font-line to generate a single-line font to be executed by the robotic system.

7. Print File

The computer system can: receive a text string including string of characters; and convert the text string into a print file including a distribution of user glyphs and synthetic glyphs for each character represented in the character string. Generally, the computer system can: read in a particular character from the first element of the character string; access the character container of the particular character stored in the handwriting model; retrieve a representative glyph (e.g., a digital representation of a user glyph or a synthetic glyph) of the particular character from the character container; and export the representative glyph to the print file to be executed by a robotic system.

In one implementation, the computer system can: access the character container of the particular character stored in the handwriting model; and—if a digital representation of a user glyph has not yet been exported to the print file—export the digital representation of a user glyph to the print file instead of a synthetic glyph. Therefore, the computer system can prioritize digital representations of user glyphs over synthetic glyphs to mimic the handwriting of the user with greater accuracy and to reduce unnecessary processing and storage for characters that do not appear frequently or at all in a character string.

In another implementation, if all stored digital representations of user glyphs and all stored synthetic glyphs have already been exported to the print file, the computer system can: generate a new synthetic glyph; export the new synthetic glyph to the print file; and store the new synthetic glyph in the character container of the particular character stored in the handwriting vector. Therefore, the computer system can ensure each representative glyph exported to the print file is a unique glyph such that the resultant document contains no repeated glyphs.

In one implementation, the computer system can: receive a text string including a new character not included in the handwriting sample of the user; and generate a synthetic glyph—for insertion into the print file—for this new character on the fly. For example, in response to identifying a new character (e.g., with no corresponding character container) in the text string, the computer system can prompt the user to provide a user glyph (e.g., a handwritten sample) of the new character. The computer system can extract spatial features from the user glyph of the new character to generate a synthetic glyph (e.g., approximating the user glyph) corresponding to the new character on the fly. If there is more than one instance of the new character in the text file, the computer system can insert variability to generate a set of synthetic glyphs from the initial synthetic glyph. Alternatively, in another example, the computer system can approximate a synthetic glyph for this new character based on the handwriting model of the user, such as based on how the user handwrites similar characters or how the user handwrites particular features of the new character. In yet another example, the computer system can access a generic handwriting model—including a generic character container corresponding to the new character—to generate a synthetic glyph for the new character.

8. Robotic System

Generally, the computer system can implement the handwriting vector to generate a "handwritten" document in cooperation with a robotic system configured to: receive the handwriting vector; and manipulate a writing implement to mimic the handwriting of the user according to the handwriting vector onto a surface (e.g., a sheet of paper). For example, the computer system can: apply a handwriting vector to a text file (e.g., a typed paragraph of text) to generate a print file; and export the print file to the robotic system (as described in U.S. Pat. No. 9,048,779). The robotic system can be configured to maneuver a pen across a sheet of paper to generate a "handwritten" document according to the print file generated by the computer system.

In one implementation, the computer system can export the handwriting vector to the robotic system using a Cartesian coordinate system (e.g., x, y, z) such that the writing implement of the robotic system can move through a set of (x, y, z) coordinates to mimic the handwriting of the user.

In another implementation, the computer system can export the handwriting vector to the robotic system using a polar coordinate system (e.g., θ, ϕ, r). For example, the computer system can generate a vector path including waypoints for the robotic system to anchor the writing implement and execute segments of the character string. By using polar coordinates, the computer system can better emulate the hand motions of the user (e.g., the user moving her hand incrementally along a line to resting points as she writes) and the angles of the writing implement with respect to the paper (e.g., to generate lines with varying opacity orthogonal to the line path due to the angle of the writing implement).

The computer system and the robotic system can be configured to cooperate to receive a single text file from the user and produce multiple unique copies of the text file, each in a typeface mimicking handwriting of the user. In particular, the computer system and the robotic system can be configured to introduce variability to printed copies of the text file both via variability in typefaces (e.g., defined by the handwriting model) and/or mechanical variability by the robotic system. The computer system and/or robotic system can each define a set of variability bounds such that an amount of variability introduced is within reasonable bounds and therefore the printed copies of the text file match the handwriting of the user.

In one implementation, the robotic system is configured to generate variability between copies of a single print file in order to generate multiple unique copies of the single print file. For example, the robotic system can define a slop factor (e.g., between zero and one) configured to generate variance between different copies of a single print file (e.g., with no two instances of a single character appearing exactly the same). Additionally and/or alternatively, the computer system can export a speed element as part of the vector (e.g., x, y, z, v), such that the robotic system can vary the speed of the writing implement while executing each synthetic glyph to vary the thickness and opacity of the line segments of each glyph (e.g., speeding up the writing implement at the end of a glyph or sentence to generate a trail).

Alternatively, in another implementation, as shown in FIG. 2A, the computer system can be configured to generate multiple unique print files and transmit these print files to the robotic system for generating printed copies. For example, the computer system can: receive a text string in the form of a text file from a user; access a handwriting model associated with the user to convert the text string to a first synthetic text string in the form of a first print file; access the handwriting model to convert the text string to a second synthetic text string in the form of a second print file; and transmit the first and second print file to the robotic system for execution of the first and second print files to generate a first copy and a second copy of the text string. In this example, the computer system and the robotic system cooperate to generate the first copy and the second copy of the text string, such that each instance of each character is unique to both the first and second copy of the text file.

In yet another implementation, as shown in FIG. 2B, the robotic system can be configured to generate unique printed files of a text string on the fly. For example, the handwriting model of the user can initially be loaded onto the robotic system. Then, the robotic system can: access a text string; input the text string into the handwriting model to generate a series of ephemera, each ephemera unique to each other ephemera in the series of ephemera; and print the series of ephemera to generate a series of unique printed copies of the text string.

9. Writer Profiles and Synthetic Handwriting Vector

In one variation, the computer system (or a computer system): extracts attributes of human pen strokes (e.g., glyph shape, implement pressure, writing speed, glyph slant glyph spacing, line curvature, stroke intersection location) present in user glyphs in the handwriting sample supplied by the user; queries the user for user characteristics, such as handedness, age, gender, occupation, and mood (e.g., happy, excited, sad, angry, busy, calm); and then stores these attributes and user characteristics in a writer profile for the user. The computer system can repeat this process for (many) other users and/or for this same user under different conditions (e.g., when experiences different moods) to generate a corpus of writer profiles labeled with characteristics of these users (e.g., handedness and user mood). The computer system can then implement artificial intelligence, machine learning, and/or regression techniques, etc. to compile these labeled writer profiles and to generate a new synthetic writer profile for a particular combination of user characteristics (e.g., a happy left-handed teenager, an excited 40-year-old male plumber, a busy 50-year-old female CEO). The computer system can then generate a new synthetic handwriting vector for this combination of user characteristics based on the new synthetic writer profile.

Therefore, in this variation, the computer system (or the computer system) can leverage writing profiles of a population of users of known characteristics to generate new synthetic writing profiles and new synthetic handwriting vectors representative of subpopulations of humans of particular characteristics. Later, rather than request a handwriting sample from a new user, the native application can instead: query the new user for certain characteristics (e.g., her age, handedness, occupation) and a mood she wishes to communicate in synthetic handwriting (e.g., happy, sad, busy); and then implement artificial intelligence, etc. to generate a new synthetic writing profile and new synthetic handwriting vector that fulfills these characteristics and the mood elected by the new user based on the corpus of writing profiles previously generated based on writing samples provided by earlier users. For example, in this variation, the computer system can generate a new synthetic handwriting vector for a new user within a few seconds based on a small number of (e.g., fewer than ten) characteristics selected from dropdown menus within an instance of the native application rather than interface with the new user to collect a writing sample over multiple minutes.

However, the computer system can implement any other method or technique to generate a writing profile for a user and to generate synthetic handwriting vector based on writing profiles of one user or a population of users.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   during a first time period:
   accessing a handwriting sample comprising a set of user glyphs handwritten by a user and representing a set of characters;
   for each character in the set of characters:
   identifying a subset of user glyphs, in the handwriting sample, corresponding to the character;
   characterizing a set of spatial features representative of the character across the subset of user glyphs; and
   storing the set of spatial features in a character container, in a set of character containers, corresponding to the character;
   compiling the set of character containers into a handwriting model associated with the user; and
   during a second time period succeeding the first time period:
   accessing a text string comprising a combination of characters;
   for each instance of each character in the text string, generating a synthetic glyph, in a set of synthetic glyphs, representing the character based on the handwriting model; and
   assembling the set of synthetic glyphs into a print file.

2. The method of claim 1, further comprising exporting the print file to a robotic system configured to manipulate a writing instrument to generate a printed copy of the text string according to the print file, the printed copy defining a first typeface associated with the user.

3. The method of claim 1:
   wherein generating the synthetic glyph based on the handwriting model comprises inserting a set of variability parameters into the handwriting model to generate the synthetic glyph; and
   wherein assembling the set of synthetic glyphs into the print file comprises assembling the set of synthetic glyphs into the print file, each synthetic glyph, in the set of synthetic glyphs, unique to each other synthetic glyph in the set of synthetic glyphs.

4. The method of claim 3, further comprising, during the second time period:
   for each instance of each character in the text string, inserting a second set of variability parameters into the handwriting model to generate a second synthetic glyph, in a second set of synthetic glyphs, representing the character, the second set of variability parameters unique to the set of variability parameters; and
   assembling the second set of synthetic glyphs into a second print file, each synthetic glyph in the second set of synthetic glyphs unique to each other synthetic glyph in the first set of synthetic glyphs and the second set of synthetic glyphs.

5. The method of claim 3:
   wherein accessing the text string comprises accessing the text string comprising a combination of a first instance of an "a" character and a second instance of the "a" character;
   wherein inserting the set of variability parameters into the handwriting model to generate the synthetic glyph representing the character for each instance of each character comprises:
   for the first instance of the "a" character, inserting a first set of variability parameters into the handwriting model to generate a first synthetic glyph, in the set of synthetic glyphs, representing the "a" character; and
   for the second instance of the "a" character, inserting a second set of variability parameters into the handwriting model to generate a second synthetic glyph, in the set of synthetic glyphs, representing the "a" character, the second synthetic glyph unique to the first synthetic glyph; and
   wherein assembling the set of synthetic glyphs into the print file comprises assembling the first synthetic glyph and the second synthetic glyph into the print file.

6. The method of claim 1:
further comprising:
identifying a subset of user glyph connectors, in the handwriting sample, corresponding to the character, each user glyph connector defining a pathway between an endpoint of the character and a start point of a next character;
characterizing a second set of spatial features across the subset of user glyph connectors; and
storing the second set of spatial features in a connector container, in a set of connector containers, corresponding to the character; and
wherein compiling the set of character containers into the handwriting model associated with the user further comprises compiling the set of character containers and the set of character containers into the handwriting model associated with the user.

7. The method of claim 1, wherein accessing the handwriting sample comprising the set of user glyphs comprises accessing the handwriting sample comprising the set of user glyphs representing the set of characters comprising:
a first subset of characters, in the set of characters, comprising letters "A" through "Z" in upper-case form; and
a second subset of characters, in the set of characters, comprising letters "a" through "z" in lower-case form.

8. The method of claim 1:
wherein accessing the text string comprising the combination of characters comprises accessing the text string comprising a new character excluded from the set of characters; and
wherein generating the synthetic glyph representing the character based on the handwriting model comprises:
accessing a generic character container corresponding to the new character;
rectifying the generic character container based on variability of spatial features across the set of characters to interpret a predicted character container corresponding to the new character;
inserting the predicted character container into the handwriting model; and
generating the synthetic glyph representing the new character based on the predicted character container stored in the handwriting model.

9. The method of claim 1:
wherein characterizing the set of spatial features representative of the character comprises:
matching the subset of user glyphs corresponding to the character to a template format, in a set of template formats, corresponding to the character;
identifying the set of spatial features representative of the character based on the template format; and
for each user glyph in the subset of user glyphs:
scanning the user glyph for the set of spatial features defined by the template format for the character; and
extracting a dimensional value for each spatial feature, in the set of spatial features, from the user glyph.

10. The method of claim 1:
wherein characterizing the set of spatial features, for each character in the set of characters, based on the subset of user glyphs comprises, characterizing variability of the set of spatial features, for each character in the set of characters, comprising, for each spatial feature in the set of spatial features:
calculating an average spatial feature, in a set of average spatial features, for the spatial feature across the subset of user glyphs; and
characterizing a deviation, in a set of deviations, of the spatial feature from the average spatial feature across the subset of user glyphs; and
wherein storing the set of spatial features in the character container comprises storing variability of the set of spatial features in the character container comprising storing the set of average spatial features and the set of deviations in the character container.

11. The method of claim 1, further comprising:
exporting the print file to a robotic system configured to manipulate a writing instrument; and
at the robotic system:
ingesting a slop factor configured to generate mechanical variability in manipulation of the writing instrument; and
manipulating the writing instrument to generate a printed copy of the text string according to the print file and the slop factor.

12. The method of claim 1:
wherein characterizing the set of spatial features based on the subset of user glyphs comprises characterizing variability of the set of spatial features across the subset of user glyphs; and
wherein storing the set of spatial features in the character container corresponding to the character comprises storing variability of the set of spatial features in the character container corresponding to the character.

13. A method comprising:
accessing a handwriting sample of a user;
identifying a first set of user glyphs representative of a first character, in a set of characters, represented in the handwriting sample;
for a first user glyph, in the first set of user glyphs, corresponding to a first instance of the first character, extracting a first set of spatial features representative of the first character;
for a second user glyph, in the first set of user glyphs, corresponding to a second instance of the first character, extracting a second set of spatial features representative of the first character and analogous the first set of spatial features;
interpolating a first set of synthetic spatial features based on the first set of spatial features of the first user glyph and the second set of spatial features of the second user glyph;
generating a first synthetic glyph of the first character based on the first set of synthetic spatial features;
compiling the first user glyph, the second user glyph, and the first synthetic glyph into a first character container, in a set of character containers, corresponding to the first character; and
compiling the set of character containers into a handwriting model associated with the user.

14. The method of claim 13, further comprising:
receiving a text string comprising a combination of characters;
for each instance of each character in the text string, inserting a set of variability parameters into the handwriting model to generate a synthetic glyph, in a set of synthetic glyphs, representing the character; and
assembling the set of synthetic glyphs into a print file.

15. The method of claim 14:
wherein extracting the first set of spatial features comprises:

extracting a first spatial feature value of a first spatial feature, in the first set of spatial features, of the first user glyph; and characterizing a first spatial feature deviation for the first spatial feature based on the first spatial feature value and a fixed spatial feature value defined for the first character;

wherein extracting the second set of spatial features comprises:

extracting a second spatial feature value of a second spatial feature, in the second set of spatial features, of the second user glyph, the second spatial feature analogous the first spatial feature; and characterizing a second spatial feature deviation for the second spatial feature based on the second spatial feature value and the fixed spatial feature value defined for the first character;

wherein interpolating the first set of synthetic spatial features comprises:

estimating a first synthetic spatial feature value based on the first spatial feature value and the second spatial feature value; and characterizing a synthetic spatial feature deviation based on the first synthetic spatial feature value and the fixed spatial feature value; and wherein generating the first synthetic glyph of the first character based on the first set of spatial features comprises generating the first synthetic glyph of the first character based on the third spatial feature value and the third spatial feature deviation.

16. The method of claim 13:

wherein extracting the first set of spatial features representative of the first character for the first user glyph comprises extracting a first spatial feature, in the first set of spatial features, representative of the first character for the first user glyph;

wherein extracting the second set of spatial features representative of the first character for the second user glyph, the second set of spatial features analogous the first set of spatial features, comprises extracting a second spatial feature, in the second set of spatial features, representative of the first character for the second user glyph, the second spatial feature analogous the first spatial feature;

wherein interpolating the first set of synthetic spatial features based on the first set of spatial features of the first user glyph and the second set of spatial features of the second user glyph comprises interpolating a first synthetic spatial feature, in the first set of synthetic spatial features, based on the first spatial feature of the first user glyph and the second spatial feature of the second user glyph; and wherein generating the first synthetic glyph based on the first set of synthetic spatial features comprises generating the first synthetic glyph based on the first synthetic spatial feature.

17. The method of claim 16:

wherein extracting the first set of spatial features representative of the first character for the first user glyph comprises extracting the first spatial feature and a third spatial feature, in the first set of spatial features, representative of the first character for the first user glyph;

wherein extracting the second set of spatial features representative of the second character for the second user glyph comprises extracting the second spatial feature and a fourth spatial feature, in the second set of spatial features, representative of the first character for the second user glyph, the fourth spatial feature analogous the third spatial feature;

wherein interpolating the first set of synthetic spatial features based on the first set of spatial features of the first user glyph and the second set of spatial features of the second user glyph comprises interpolating:

the first synthetic spatial feature based on the first spatial feature and the second spatial feature; and a second synthetic spatial feature based on the third spatial feature of the first user glyph and the fourth spatial feature of the second user glyph; and wherein generating the first synthetic glyph based on the first set of synthetic spatial features comprises generating the first synthetic glyph based on the first synthetic spatial feature and the second synthetic spatial feature.

18. A method comprising:

during a first time period:

accessing a handwriting sample comprising a set of user glyphs handwritten by a user and representing a set of characters;

for each character in the set of characters:

detecting a subset of user glyphs, in the set of user glyphs, corresponding to the character;

identifying a set of spatial features representative of the character across the subset of user glyphs;

initializing a set of coefficients within a character container, in a set of character containers, corresponding to the character based on the set of spatial features of the subset of user glyphs;

initializing a variability vector;

inserting the set of coefficients and the variability vector into a synthetic handwriting generator to generate a synthetic glyph of the character;

characterizing a difference between the synthetic glyph and the subset of user glyphs corresponding to the character; and in response to the difference exceeding a threshold difference, adjusting the set of coefficients and the variability vector to reduce the difference; and compiling the set of character containers into a handwriting model associated with the user; and during a second time period of time succeeding the first time period of time:

accessing a text string comprising a combination of characters in the set of characters;

for each instance of each character in the text string, generating a synthetic glyph, in a set of synthetic glyphs, representing the character based on the handwriting model; and assembling the set of synthetic glyphs into a print file.

19. The method of claim 18, further comprising, during an initial period preceding the first time period:

accessing a corpus of handwriting samples of a population of users, each handwriting sample, in the set of handwriting samples, comprising a corpus of user glyphs representing the set of characters;

implementing a spatial feature extractor to extract derive a global character container for each character, in the set of characters, across the population of users; and training the synthetic handwriting generator to:

ingest the text string file-comprising the set of characters and the handwriting model associated with the user; and generate the set of synthetic glyphs corresponding to the set of characters and according to the handwriting model.

20. The method of claim 18:
wherein initializing the set of coefficients based on the set of spatial features comprises initializing the set of coefficients representing:
- a spatial average of each spatial feature, in the set of spatial features, across the subset of user glyphs; and
- a spatial variability of each spatial feature, in the set of spatial features, across the subset of user glyphs.

* * * * *